United States Patent [19]  [11] 4,233,207
Spivack  [45] Nov. 11, 1980

[54] HYDROLYTICALLY STABLE ORTHO-ALKYLATED PHENYL PHOSPHONITES AND STABILIZED COMPOSITIONS

[75] Inventor: John D. Spivack, Spring Valley, N.Y.
[73] Assignee: Ciba-Geigy Corporation, Ardsley, N.Y.
[21] Appl. No.: 55,665
[22] Filed: Jul. 9, 1979

Related U.S. Application Data

[63] Continuation of Ser. No. 882,725, Mar. 2, 1978, abandoned.

[51] Int. Cl.³ .................. C08K 3/32; C08L 23/32; C07F 9/02; C07F 9/48
[52] U.S. Cl. .................. 260/45.7 P; 260/45.95 D; 260/941; 260/942; 260/960; 260/962; 260/45.7 PH
[58] Field of Search .............. 260/941, 942, 960, 962, 260/45.7 P, 45.7 PH

[56] References Cited

U.S. PATENT DOCUMENTS

| | | | |
|---|---|---|---|
| 2,714,120 | 7/1955 | Rehe | 260/941 |
| 3,029,276 | 4/1962 | Hausweiler et al. | 260/941 |
| 3,112,338 | 11/1963 | Smutny | 260/941 |
| 3,330,859 | 7/1967 | Dexter et al. | 260/941 |
| 3,364,250 | 1/1968 | Jones et al. | 260/941 |
| 3,367,870 | 2/1968 | Spivack | 260/941 |
| 3,609,118 | 12/1971 | Pitz | 260/941 |
| 3,809,676 | 5/1974 | Liberti | 260/941 |
| 3,825,629 | 7/1974 | Hofer et al. | 260/941 |
| 3,900,410 | 8/1975 | Malec | 260/941 |
| 3,978,020 | 8/1976 | Liberti | 260/941 |
| 4,094,855 | 6/1978 | Spivack | 260/941 |
| 4,163,007 | 7/1979 | Lind et al. | 260/941 |

FOREIGN PATENT DOCUMENTS 48-41009 12/1973 Japan ..................... 260/941

OTHER PUBLICATIONS

R. B. Fox, J. Am. Chem. Soc. 72, 4147 (1950).
Sakurai, et al., CA, 63, 9982c (1950).
Wang et al., J. Am. Chem. Soc. 79, 1924 (1957).
Pearson, et al., J. Org. Chem., 25 867, (1960).
Rundel, Z. Naturforsch, 15, 546 (1960).

Primary Examiner—John D. Randolph
Assistant Examiner—Robert C. Whittenbaugh
Attorney, Agent, or Firm—Luther A. R. Hall

[57] ABSTRACT

Hydrolytically stable, ortho-alkylated phenyl phosphonites of the formula

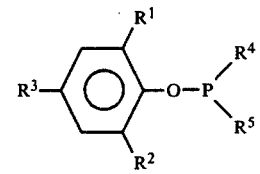

wherein $R^1$ and $R^2$ are alkyl or phenylalkyl, $R^3$ is hydrogen, alkyl or carboalkoxyalkyl, $R^4$ is alkyl, phenyl or phenyl substituted by alkyl, $R^5$ is halogen, —XH or $XR^6$ where X is O or S and $R^6$ is phenyl substituted by alkyl, phenylalkyl or carboalkoxyalkyl, are useful as stabilizers for organic polymers and lubricating oils, particularly as processing stabilizers for polyolefins.

20 Claims, No Drawings

HYDROLYTICALLY STABLE ORTHO-ALKYLATED PHENYL PHOSPHONITES AND STABILIZED COMPOSITIONS

This is a continuation of application Ser. No. 882,725, filed on Mar. 2, 1978, now abandoned.

BACKGROUND OF THE INVENTION

This invention relates to hindered ortho-alkylated phenyl phosphites which are effective in stabilizing organic materials particularly plastics, polymers and resins as well as mineral and synthetic fluids and oils.

Organic polymeric materials such as plastics and resins and lubricating and mineral oil are subject to thermal, oxidative and photodegradation. A great variety of stabilizers are known in the art for stabilizing various substrates. Their effectiveness varies depending on the causes of degradation and the substrate stabilized. It is known that many stabilizers that are very effective long term antioxidants are relatively poor process stabilizers which require stabilization of the substrate, against thermal degradation for a short time, but at a relatively high temperature. Many stabilizers are relatively incompatible with the substrates which causes problems during the lift of a product and lessens the stabilizer's effectiveness. Some stabilizers are either too volatile or thermally or hydrolytically unstable to be practical as commercial stabilizers.

In Japanese No. 73/41,009 (CA, 81, 121856g (1974)), a non-hindered phenylphosphonite and a non-hindered phenylthiophosphonite are disclosed as heat stabilizers for ABS, PVC, polyolefins and other polymeric substances.

Diphenylphosphonites, diphenylene bis-phosphonites and terphenylene bis-phosphonites are described in U.S. Pat. No. 3,825,629 as stabilizers for organic materials. These compounds are structurally different from the instant compounds especially in reference to the diphenyl or terphenyl moiety directly attached to the P atom in these molecules.

Thermostabilized liner polyesters containing small amounts of diphenyl phenylphosphonite are claimed in U.S. Pat. No. 3,609,118. This patent contains a very broad generic reference to phenylphosphonites with no subgeneric disclosures and with only diphenyl phenylphosphonite being exemplified.

U.S. Pat. No. 3,809,676 and U.S. Pat. No. 3,978,020 disclose generically some phosphonites of structures related to those of the instant invention, but do not exemplify or specifically mention the specific genus of phosphonites of this invention. These references respectively pertain to thermally stable flame retardant polycarbonates containing a phosphonite or phosphinite in combination with a barium, calcium or cerium alkanoate or carbonate and to thermally stable polycarbonates containing a phosphonite and an epoxide compound.

The instant phosphonites are more effective as stabilizers than the closest prior art phosphonites. They also surprisingly exhibit far superior hydrolytic stability compared to many of the previously known phosphonites. This superior hydrolytic stability permits the instant phosphonites to be used in those myriad of cases where water pickup is a disadvantage and presents practical end use problems in the product composition being stabilized. One such example is in polyester fibers where the use of stabilizers which hydrolyze and/or are hygroscopic cause undesired swelling of the fiber and ancillary deficiencies.

It was found that the instant phosphonites presumedly because of their structural character overcome these deficiencies of the prior art phosphonites and thus combine excellent stabilizing efficacy with hydrolytic stability and the absence of secondary performance problems related to hydrolysis and/or the water pickup of the prior art phosphonite stabilizers. Indeed, the instant compounds possess a combination of desired properties including outstanding stabilization efficiency especially at high temperatures, and not only do not detract from light stabilization, but actually exhibit light stability properties, acceptable hydrolytic stability and good color in stabilized compositions.

DETAILED DISCLOSURE

This invention pertains to hydrolytically stable ortho-alkylated phenyl phosphonites and to organic materials, both polymeric and non-polymeric, stabilized by said phosphonites.

More particularly, the phosphonites of this invention are represented by the Formula I

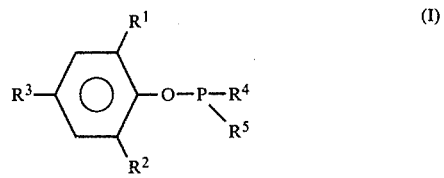

wherein
$R^1$ is branched alkyl of 3 to 18 carbon atoms, benzyl, α-methylbenzyl or α,α-dimethylbenzyl, $R^2$ is alkyl of 1 to 18 carbon atoms, benzyl, α-methylbenzyl or α,α-dimethylbenzyl, $R^3$ is hydrogen, alkyl of 1 to 18 carbon atoms, carboalkoxy of 2 to 19 carbon atoms, carboalkoxyalkyl of 3 to 24 carbon atoms, carbophenoxy, carbophenoxyalkyl of 8 to 16 carbon atoms; or carbophenoxy or carbophenoxyalkyl with the phenoxy substituted with 1 to 3 alkyl groups with 1 to 8 carbon atoms in each alkyl group, $R^4$ is alkyl of 1 to 18 carbon atoms, phenyl or phenyl substituted by 1 to 3 alkyl groups with 1 to 8 carbon atoms in each alkyl group, $R^5$ is halogen, —XH or —$XR^6$, X is O or S, $R^6$ is phenyl, substituted by alkyl, having the formula

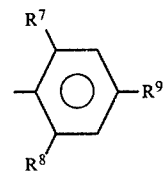

where
$R^7$ is hydrogen, branched alkyl of 3 to 18 carbon atoms, benzyl, α-methylbenzyl, or α,α-dimethylbenzyl, $R^8$ is hydrogen, alkyl of 1 to 18 carbon atoms, benzyl, α-methylbenzyl or α,α-dimethylbenzyl, and $R^9$ is hydrogen, alkyl of 1 to 18 carbon atoms, carboalkoxy of 2 to 19 carbon atoms, carboalkoxyalkyl of 3 to 24 carbon atoms, carbophenoxy, carbophenoxyalkyl of 8 to 16 carbon atoms; or carbophenoxy or carbophenoxyalkyl with the phenoxy substituted with 1 to 3 alkyl groups with 1 to 8 carbon atoms in each alkyl group.

$R^1$ is branched alkyl of 3 to 18 carbon atoms such as isopropyl, tert-butyl, sec-butyl, isoamyl, tert-amyl, tert-octyl, tert-dodecyl or tert-octadecyl. Preferably $R^1$ is branched alkyl of 4 to 12 carbon atoms such as tert-butyl, tert-amyl, tert-octyl or tert-dodecyl or is α-methylbenzyl or α,α-dimethylbenzyl. Most preferably $R_1$ is tertiary alkyl of 4 to 8 carbon atoms such as tert-butyl or tert-octyl.

$R^2$ is alkyl of 1 to 18 carbon atoms such as methyl, isopropyl, tert-butyl, n-octyl, tert-octyl, n-dodecyl or octa-decyl. Preferably $R^2$ is alkyl of 3 to 12 carbon atoms, α-methylbenzyl or α,α-dimethylbenzyl. Most preferably $R^2$ is a branched alkyl of 4 to 8 carbon atoms such as tert-butyl, tert-amyl or tert-octyl.

$R^3$ is alkyl of 1 to 18 carbon atoms such as methyl, butyl, hexyl, octyl, nonyl, dodecyl or octadecyl. $R^3$ is also carboalkoxy of 2 to 19 carbon atoms such as carbomethoxy, carboethoxy, carboethoxy or carbooctadecyloxy. $R^3$ can also be carboalkoxyalkyl of 3 to 24 carbon atoms such as carbomethoxymethyl, carbomethoxymethyl, carboethoxymethyl, carbobutoxybutyl, carbooctoxymethyl, carbododecyloxyethyl or carbooctadecyloxyhexyl. $R^3$ can also be carbophenoxy or carbophenoxyalkyl of 8 to 16 carbon atoms such as carbophenoxymethyl, carbophenoxyethyl or carbophenoxynonyl. The phenoxy groups of carbophenoxy or carbophenoxyalkyl can also be substituted with 1 to 3 alkyl groups with 1 to 8 carbon atoms in each alkyl group. Such substituted phenoxy groups would include p-tolyloxy, p-tert-butylphenoxy, 2,4-di-tert-butylphenoxy, mesityloxy, 2,4,6-tri-tert-butylphenoxy or p-tert-octylphenoxy.

Preferably $R^3$ is hydrogen, alkyl of 1 to 18 carbon atoms, carboalkoxy of 2 to 19 carbon atoms, carboalkoxyalkyl of 3 to 21 carbon atoms or carbophenoxy with the phenoxy substituted with 1 to 3 alkyl groups with 1 to 8 carbon atoms in each alkyl group.

Most preferably $R^3$ is hydrogen, alkyl of 1 to 9 carbon atoms, carboalkoxy of 2 to 9 carbon atoms, carboalkoxyalkyl of 3 to 11 carbon atoms or carbophenoxy with the phenoxy substituted with 1 to 3 alkyl groups with 1 to 4carbon atoms in each alkyl group.

$R^4$ is alkyl of 1 to 18 carbon atoms such as methyl, ethyl, butyl, octyl, dodecyl, hexadecyl or octadecyl. $R^4$ can also be phenyl or phenyl substituted by 1 to 3 alkyl groups with 1 to 8 carbon atoms in each alkyl group. Such substituted phenyls would include o-tolyl, m-tolyl, p-tolyl, o-xylyl, m-xylyl, p-xylyl, mesityl, o-cumyl, p-tert-butylphenyl, 2,4,6-tri-tert-butylphenyl or 2,4,6-tri-tert-octylphenyl.

Preferably $R^4$ is alkyl of 1 to 18 carbon atoms, phenyl or phenyl substituted by 1 to 3 alkyl groups with 1 to 8 carbon atoms in each alkyl group.

Most preferably $R^4$ is phenyl or phenyl substituted by 1 to 3 alkyl groups with 1 to 4 carbon atoms in each alkyl group.

$R^5$ is halogen such as chlorine or bromine preferably chlorine, or —XH or —XR6.

Preferably $R^5$ is a chlorine or —XR⁶.

X is O or S, preferably O.

$R^7$ is hydrogen or is defined as is $R^1$ above. Preferably $R^7$ is hydrogen, branched alkyl of 4 to 12 carbon atoms, α-methylbenzyl or α,α-dimethylbenzl. Most preferably $R^7$ is tertiary alkyl of 4 to 8 carbon atoms.

$R^8$ is hydrogen or is defined as is $R^2$ above. Preferably $R^8$ is hydrogen, alkyl of 1 to 12 carbon atoms, α-methylbenzyl, or α,α-dimethylbenzyl. Most preferably $R^8$ is hydrogen or alkyl of 1 to 8 carbon atoms.

$R^9$ is hydrogen or is defined as $R^3$ above. Preferably $R^9$ is hydrogen, alkyl of 1 to 18 carbon atoms, carboalkoxy of 2 to 19 carbon atoms, carboalkoxyalkyl of 3 to 21 carbon atoms or carbophenoxy with the phenoxy substituted with 1 to 3 alkyl groups with 1 to 8 carbon atoms in each alkyl group.

Most preferably $R^9$ is hydrogen, alkyl of 1 to 9 carbon atoms, carboalkoxy of 2 to 9 carbon atoms, carboalkoxyalkyl of 3 to 11 carbon atoms or carbophenoxy with the phenoxy substituted with 1 to 3 alkyl groups with 1 to 4 carbon atoms in each alkyl group.

It is understood that preferably all of $R^7$, $R^8$ and $R^9$ cannot be hydrogen at the same time.

Particularly preferred embodiments of the instant phosphonites are those where $R^1$ is isopropyl or tert-butyl, $R^2$ is alkyl of 1 to 4 carbon atoms, $R^3$ is hydrogen, alkyl of 1 to 18 carbon atoms, —CH₂CH₂COOCH₃, —COOCH₃, —COOC₁₈H₃₇ or

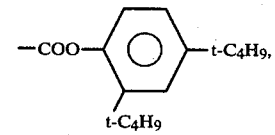

$R^4$ is alkyl of 1 to 18 carbon atoms or phenyl,
$R^5$ is chlorine, XH, or XR⁶,
X is O, $R^6$ is

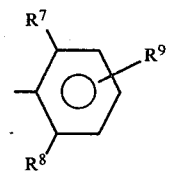

$R^7$ is hydrogen, isopropyl or tert-butyl, $R^8$ is hydrogen or alkyl of 1 to 4 carbon atoms, and $R^9$ is alkyl of 1 to 4 carbon atoms, —COOCH₃, —CH₂CH₂COOCH₃ or

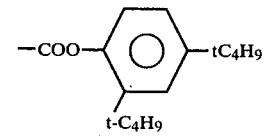

with the proviso that both of $R^7$ and $R^8$ cannot be hydrogen at the same time.

SYNTHESIS OF COMPOUNDS

1. 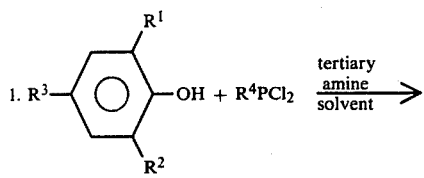

III    IV

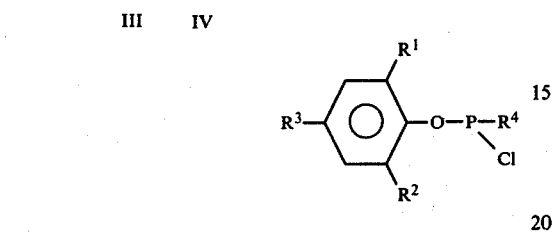

V

2. V + HR⁵ $\xrightarrow[\text{solvent}]{\text{tertiary amine}}$ 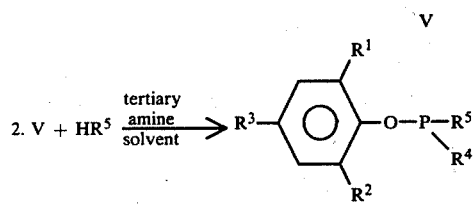

VI

3. V + H₂X $\xrightarrow{\text{tertiary amine}}$ 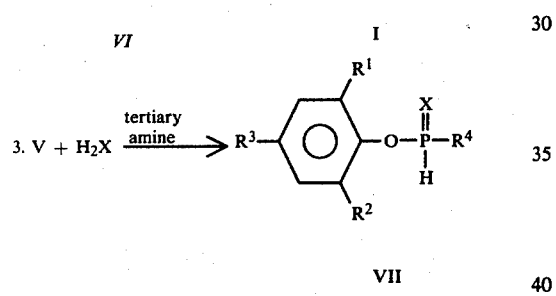

VII

1. 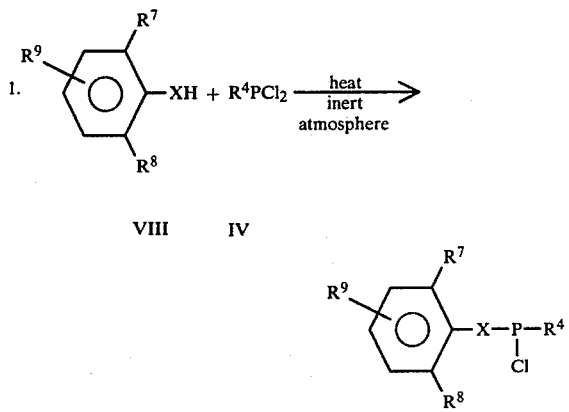

VIII    IV

IX

2. IX + 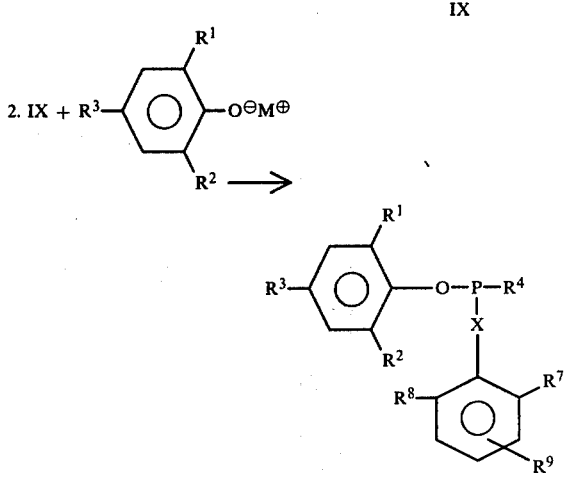

X which prepares novel intermediates IX of value as outlined below:

The meanings of R¹, R², R³, R⁴, R⁷, R⁸ and R⁹ are as defined earlier. The intermediate IX differs from intermediate V in that in compound IX one of R⁷ and R⁸ may be hydrogen although all of R⁷, R⁸ and R⁹ cannot be hydrogen at the same time.

The various starting materials, i.e., phenols, thiophenols, chlorophosphines, are largely available as items of commerce or can be easily prepared by known methods.

The compounds of this invention are effective light stabilizers and/or antioxidants in a wide range of organic polymers. Polymers which can be stabilized include:

1. Polymers which are derived from mono- or diolefins, e.g., polyethylene which can optionally be crosslinked, polypropylene, polyisobutylene, polymethylbutene-1, polymethylpentene-1, polyisoprene, polybutadiene.

2. Mixtures of the homopolymers cited under (1), for example mixtures of polypropylene and polyethylene, polypropylene and polybutene-1, polypropylene and polyisobutylene.

3. Copolymers of the monomers based on the homopolymers cited under (1), for example ethylene/propylene copolymers, propylene/butene-1 -copolymers, The use of tertiary amines can be avoided by converting the phenols (or thiophenols) of formula III or VI to the phenolate (or thiophenolate) anion in either or both of the steps (1, 2) of the synthesis by reaction with stoichiometric amounts of alkali metal or alkali metal hydroxide and subsequently reacting the anion appropriately with IV or V.

Aromatic hydrocarbons such as benzene, toluene or xylene are useful as solvents for the synthesis, but are not essential.

The reaction steps can be conveniently performed by using tertiary amines such as triethylamine, pyridine, N,N-dimethylaniline, but again their use is not essential.

The use of excess tertiary amine over that required as a proton acceptor markedly increases the reaction rates in the synthetic steps. This is particularly important when III and VI are highly hindered phenols.

Reaction temperatures may vary from below room temperature to the reflux temperature of the solvent present. When no solvent is used, temperatures up to about 200° C. are useful.

Although intermediate compound V may be isolated, it is possible to carry out the entire synthesis of I without the isolation of the intermediate product.

An alternative procedure to the synthesis of the instant compounds involves a reverse reaction sequence propylene/isobutylene copolymers, ethylene/butene-1-copolymers as well as terpolymers of ethylene and propylene with a diene, for example hexadiene, dicyclopentadiene or ethylidene norbornene, and copolymers of α-olefins, e.g., ethylene with acrylic or methacrylic acid.

4. Polystyrene.

5. Copolymers of styrene and of α-methylstyrene, for example styrene/butadiene copolymers, styrene/acrylonitrile copolymers, styrene/acrylonitrile/methacrylate copolymers, styrene/acrylonitrile copolymers modified with acrylic ester polymers to provide impact strength as well as block copolymers, e.g., styrene/butadiene/styrene block copolymers.

6. Graft copolymers of styrene, for example the graft polymer of styrene to polybutadiene, the graft polymer of styrene with acrylonitrile to polybutadiene as well as mixtures thereof with the copolymers cited under (5), commonly referred to as acrylonitrile/butadiene/styrene or ABS plastics.

7. Halogen-containing vinyl polymers, for example polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, vinylidene chloride/vinyl acetate copolymers.

8. Polymers which are derived from α,β-unsaturated acids and derivatives thereof, polyacrylates and polymethacrylates, polyacrylic amides and polyacrylonitrile.

9. Polymers which are derived from unsaturated alcohols and amines and from the acyl derivatives thereof or acetals, for example polyvinyl alcohol, polyvinyl acetate, polyvinyl stearate, polyvinyl benzoate, polyvinyl maleate, polyvinyl butyral, polyallyl phthalate, polyallyl melamine and copolymers thereof with other vinyl compounds, for example ethylene/vinyl acetate copolymers.

10. Homopolymers and copolymers which are derived from epoxides, for example polyethylene oxide or the polymers which are derived from bis-glycidyl ethers.

11. Polyacetals, for example polyoxymethylene, as well as polyoxymethylenes which contain ethylene oxide as comonomer.

12. Polyalkylene oxides, for example polyoxyethylene, polypropylene oxide or polyisobutylene oxide.

13 Polyphenylene oxides.

14. Polyurethanes and polyureas.

15. Polycarbonates.

16. Polysulfones.

17. Polyamides and copolyamides which are derived from diamines and dicarboxylic acids and/or from aminocarboxylic acids or the corresponding lactams, for example polyamide 6, polyamide 6/6, polyamide 6/10, polyamide 11, polyamide 12, poly-m-phenylene-isophthalamide.

18. Polyesters which are derived from dicarboxylic acids and dialcohols and/or from hydroxycarboxylic acids or the corresponding lactones, for example polyethylene glycol terephthalate, poly-1,4-dimethylolcyclohexane terephthalate.

19. Cross-linked polymers which are derived from aldehydes on the one hand and from phenols, ureas and melamine on the other, for example phenol/formaldehyde, urea/formaldehyde and melamine/formaldehyde resins.

20. Alkyd resins, for example glycerol/phthalic acid resins and mixtures thereof with melamine/formaldehyde resins.

21. Unsaturated polyester resins which are derived from copolyesters of saturated and unsaturated dicarboxylic acids with polyhydric alcohols as well as from vinyl compounds as cross-linking agents and also the halogen-containing, flame-resistant modifications thereof.

22. Natural polymers, for example cellulose, rubber, as well as the chemically modified homologous derivatives thereof, for example cellulose acetates, cellulose propionates and cellulose butyrates and the cellulose ethers, for example methyl cellulose.

Compounds of this invention are particularly effective in stabilizing organic materials such as plastics, polymers, resins in addition to mineral and synthetic fluids such as lubricating oils, circulating oils, etc.

The compounds of this invention are particularly useful as stabilizers, especially for the protection of polyolefins, for instance, polyethylene, polypropylene, polyisobutylene, poly (butene-1), poly(pentene-1), poly(3-methylbutene-1), poly(4-methyl-pentene-1), various ethylene-propylene copolymers and the like.

Other substrates in which the compounds of this invention are particularly useful are polystyrene, including impact polystyrene, ABS resin, SBR polyisoprene, as well as natural rubber, polyesters including polyethylene terephthalate and polybutylene terephthalate, including copolymers. Also stabilized are polyurethanes, polycarbonates, polyamides such as nylon 6, 6/6 and the like as well as copolyamides and polysulfones.

The compounds of this invention may be used alone as the sole stabilizer performing either mainly an antioxidant function or a light stabilizing function or the stabilizer may combine utility as an antioxidant and light stabilizer. The stabilizers may be used with phenolic antioxidants, lubricants such as calcium stearate, pigments, colorants or dyes, UV absorbers, light stabilizers such as hindered amines, metal deactivators, talc and other fillers, etc.

In general, the stabilizers of this invention are employed from about 0.01 to about 5% by weight of the stabilized composition, although this will vary with the particular substrate and application. An advantageous range is from about 0.05 to about 2%, and especially 0.1 to about 1%.

Compounds of this invention stabilize polymers especially during high temperature processing with relatively little change in color, even though the polymer may undergo a number of extrusions. Among the polymers in which this property is especially apparent are polypropylene, polyethylene, styrenics such as ABS, polyethylene- and polybutylene-terephthalates, polycarbonates, natural rubber, synthetic rubber such as SBR. While many compounds which have been used as process stabilizers are only effective as process stabilizers for polyolefins in the presence of phenolic antioxidants, etc., compounds of this invention are effective in the absence of phenolic antioxidants.

Many of the compounds of this invention combine process stabilizing properties with the ability to confer light stability on the polymer. This is particularly important for polymer fibers where processing temperatures are among the highest and where stability to actinic light is a prime requirement. A particularly important property for stabilizers which are trivalent phosphorus esters is their non-hygroscopicity and resistance to hydrolysis in the presence of moisture in the atmosphere during ambient storage. Hygroscopicity frequently results in difficulty in incorporating the process stabilizer uniformly into the polymer causing stickiness and blockage while hydrolysis of the phosphorus ester stabilizers during storage frequently results in compounds which are less effective.

The stabilizers of Formula I may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized polymer compositions of the invention may optionally also contain various conventional additives, such as the following:

1. Antioxidants
1.1 Simple 2,6-dialkylphenols, such as, for example, 2,6-di-tert.-butyl-4-methylphenol, 2-tert.-butyl-4,6-dimethylphenol, 2,6-di-tert.-butyl-4-methoxymethylphenol and 2,6-dioctadecyl-4-methylphenol.
1.2 Derivatives of alkylated hydroquinones, such as for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl-4-hydroxy-anisole, tris-(3,5-di-tert.-butyl-4-hydroxyphenyl) phosphite, 3,5-di-tert.-butyl-4-hydroxyphenyl stearate and bis-3,5-di-tert.-butyl-4-hydroxyphenyl) adipate.
1.3 Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl) disulfide.
1.4 Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butyl-phenol), 2,6-di(3,-tert.-butyl-5-methyl-2-hydroxybenzyl)-4-methylphenol, 2,2'-methylene-bis-[4-methyl-6-(α-methylcyclohexyl)-phenol], 1,1-bis(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercaptobutane, 1,1,5,5-tetra-(5-tert.-butyl-4-hydroxy-2-methylphenyl)-pentane and ethylene glycol bis-[3,3-bis-(3-tert.-butyl-4-hydroxyphenyl)-butyrate].
1.5 O-, N- and S-benzyl compounds, such as, for example, 3,5,3',5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl) dithioterephthalate.
1.6 Hydroxybenzylated malonates, such as for example, dioctadecyl 2,2-bis-(3,5-di-tert.-butyl-2-hydroxybenzyl)-malonate, dioctadecyl 2-(3-tert.-butyl-4-hydroxy-5-methylbenzyl)-malonate di-dodecylmercapto-ethyl 2,2-bis-(3,5-di-tert.-butyl-4-hydroxybenzyl)-malonate and di-[4-(1,1,3,3-tetramethylbutyl)-phenyl]2,2-bis-(3,5-di-tert.-butyl-4-hydroxybenzyl)-malonate.
1.7 Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert-butyl-4-hydroxybenzyl)-2,3,5,6-tetramethylbenzene and 2,4,6-tri(3,5-di-tert.-butyl-4-hydroxybenzyl)-phenol.
1.8 s-Triazine compounds, such as, for example, 2,4-bis-octylmercapto-6-(3,5-di-tert.-butyl-4-hydroxy-anilino)-s-triazine, 2-octylmercato,4,6-bis-(3,5-di-tert.-butyl-4-hydroxy anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl)-s-triazine and 1,3,5-tris-(3,5-di-tert.-butyl-4-hydroxybenzyl)isocyanurate.
1.9 Amides of β-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di (3,5-di-tert.-butyl-4-hydroxyphenyl-propionyl)-hexamethylenediamine. N,N'-bis-β-(3,5-di-t-butyl-4-hydroxyphenyl)-propionylhydrazine.
1.10 Esters of β-(3,5-di-tert.-butyl-4-hydroxyphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, neopentylglycol, pentaerythritol, 3-thiaundecanol, 3-thia-pentadecanol, trimethylhexanediol, trimethylolethane, trimethylolpropane, trishydroxyethyl isocyanurate and 4-hydroxymethyl-1-phospha-2,6,7-trioxabicyclo-[2,2,2]octane.
1.11 Esters of β-(5-tert.-butyl-4-hydroxy-3-methylphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, neopentylglycol, pentaerythritol, 3-thia-undecanol, 3-thia-pentadecanol, trimethylhexanediol, trimethylolethane, trimethylolpropane, trishydroxyethyl isocyanurate and 4-hydroxymethyl-1-phospha-2,6,7-trioxabicyclo[2,2,2]octane.
1.12 Esters of 3,5-di-tert.-butyl-4-hydroxyphenylacetic acid with monohydric or polyhydric alcohols, such as for example, with methanol, ethanol, octadecanol, 1,6-hexandiol, 1,9-nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2,2,2]-octane, especially the tetrakis ester of pentaerythritol.
1.13 Benzylphosphonates, such as, for example, dimethyl 3,5-di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate and dioctadecyl 5-tert.-butyl-4-hydroxy-3-methylbenzylphosphonate.

The following may be mentioned as examples of further additives that can be used together with the stabilizer of this invention and the antioxidant:
1. Aminoaryl derivatives, e.g. phenyl-1-naphthylamine, phenyl-2-naphthylamine, N,N'-di-phenyl-p-phenylenediamine, N,N'-di-2-naphthyl-p-phenylenediamine, N,N'-di-2-naphthyl-p-phenylenediamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, mono- and dioctyliminodibenzyl, polymerized 2,2,4-trimethyl-1,2-dihydroquinoline.

Octylated diphenylamine, nonylated diphenylamine, N-phenyl-N'-cyclohexyl-p-phenylenediamine, N-phenyl-N'-isopropyl-p-phenylenediamine, N,N'-di-sec.octyl-p-phenylenediamine, N-phenyl-N'-sec.-octyl-p-phenylenediamine, N,N'-di-(1,4-dimethylpentyl)-p-phenylenediamine, N,N-40 -dimethyl-N,N'-di-(sec.-octyl)-p-phenylenediamine, 2,6-dimethyl-4-methoxy-aniline, 4-ethoxy-N-sec.-butylaniline, diphenylamine-acetone condensation product, aldol-1-naphthylamine and phenothiazine.

Discoloration effects have to be taken into account when using the above antioxidants.

2. UV-Absorbers and light-stabilizing agents 2.1 2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-α-methylbenzyl-5'-methyl, 3'-α-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2.2 2,4-bis-(2'-Hydroxyphenyl)-6-alkyl-s-triazines, e.g., the 6-ethyl-, 6-heptadecyl- or 6-undecyl-derivative.

2.3 2-Hydroxybenzophenones, e.g., the 4-hydroxy-, 4-methoxy-, 4-octoxy-, 4-decyloxy-, 4-dodecyloxy-, 4-benzyloxy-, 4,2',4'-trihydroxy- or 2'-hydroxy-4,4'-dimethoxy-derivative.

2.4 1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodecyloxybenzoyl)-benzene.

2.5 Esters of optionally substituted benzoic acids, e.g., phenylsalicylate, octylphenylsalicylate, dibenzoylresorcin, bis-(4-tert.-butylbenzoyl)-resorcin, benzoylresorcin, 3,5-d-tert.-butyl-4-hydroxybenzoic acid-2,4-di-tert.-butylphenyl ester or -octadecyl ester or -2-methyl-4,6-di-tert.-butyl ester.

2.6 Acrylates, e.g., α-cyano-β, β-diphenylacrylic acid-ethyl ester or isooctyl ester, α-carbomethoxy-cinnamic acid methyl ester, α-cyano-β-methyl-p-methoxy-cinnamic acid methyl ester or -butyl ester or N-(β-carbomethoxyvinyl)-2-methyl-indoline.

2.7 Sterically hindered amines, e.g., 4-benzoyl-2,2,6,6-tetramethylpiperidine, 4-stearyloxy-2,2,6,6-tetramethylpiperidine, bis-(2,2,6,6-tetramethylpiperidyl)-sebacate or 3-n-octyl-7,7,9,9-tetramethyl-1,3,8-triazaspiro[4,5]decane-2,4-dione.

2.8 Oxalic acid diamides, e.g., 4,4'-di-octyloxy-oxanilide, 2,2'-di-octyloxy-5,5'-di-tert.-butyl-oxanilide, 2,2'-di-dodecyloxy-5,5'-di-tert.-butyl-oxanilide, 2-ethoxy-2'-ethyl-oxanilide, N,N'-bis-(3-dimethylaminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of ortho- and para-methoxy- as well as of o- and p-ethoxy-disubstituted oxanilides.

3. Metal deactivators, e.g., oxanilide, isophthalic acid dihydrazide, sebacic acid-bis-pheylhydrazide, bis-benzylideneoxalic acid dihydrazide, N,N'-diacetaladipic acid dihydrazide, N,N'-bis-salicyloyl-oxalic acid dihydrazide, N,N'-bis-salicyloylhydrazine, N,N'-bis-(3,5-di-tert.-butyl-4-hydroxyphenylpropionyl)-hydrazine, N-salicyloyl-N'-salicylalhydrazine, 3-salicyloyl-amino-1,2,4-triazole or N,N'-bis-salicyloyl-thiopropionie acid dihydrazide.

4. Basic co-stabilizers, e.g., alkali metal salts and alkaline-earth metal salts of higher fatty acids, for example Ca-stearate, Zn-stearate, Mg-behenate, Na-ricinoleate or K-palmitate.

5. Nucleation agents, e.g., 4-tert.-butylbenzoic acid, adipic acid or diphenylacetic acid.

6. Phosphites, such as, for example, triphenyl phosphite, diphenylalkyl phosphites, phenyldialkyl phosphites, tri-(nonylphenyl) phosphite, trilauryl phosphite, trioctadecyl phosphite, 3,9-isodecyloxy-2,4,8,10-tetraoxa-3,9-diphospha-[5,5]-undecane and tri-(4-hydroxy-3,5-di-tert.butylphenyl) phosphite.

Other additives that can be incorporated in the stabilized compositions are thiosynergists such as dilauryl thiodiproprionate or distearyl thiodipropionate, lubricants such as stearyl alcohol, fillers, carbon black, asbestos, kaolin, talc, glass fibers, pigments, optical brighteners, flameproofing agents and antistatic agents.

The following examples are presented for the purpose of illustration only and are not to be construed to limit the nature or scope of the instant invention in any manner whatsoever.

EXAMPLE 1

O-(2,6-Di-tert-butyl-4-methylphenyl) phenylphosphonochloridite

To a solution of 110 grams of 2,6-di-tert-butyl-p-cresol in 252 grams of triethylamine was added at 25°–26° C. over a 15-minute period 89.5 grams of dichlorophenylphosphine. The reaction mixture was heated for 31 hours at 95°–97° C. The excess triethylamine solvent was then removed by distillation under vacuum, the resulting residue was triturated with 200 ml of dry benzene, and the white crystalline solid triethylamine hydrochloride was separated by filtration. The desired product named above was isolated from the filtrate by distillation of the benzene under vacuum and crystallization of the residue from acetonitrile. The product was obtained as white crystals melting at 103°–106° C.

EXAMPLE 2

O-(2,6-Di-tert-butyl-4-methylpheyl)-O'-(2,4-di-tert-butylphenyl) phenylphosphonite 8.24 grams of 2,4-di-tert-butylphenol was dissolved in 250 ml of toluene. To this was added 4.85 grams of a 46.3% aqueous solution of potassium hydroxide. The resulting dispersion was heated at reflux for about 5.3 hours till 3.25 grams of water was collected by azeotropic distillation, forming potassium 2,4-di-tert-butyl-pheolate as a white dispersion in toluene.

A solution of 14.48 grams of the product prepared in Example 1 in 40 ml of toluene was added dropwise to the above dispersion at 10° to 15° C. over a 10-minute period. The mixture was stirred overnight at room temperature.

The turbid mixture was then clarified by filtration and the filtrate concentrated under vacuum. The residue obtained was triturated with a mixture of acetonitrile and toluene to give the above named product as white crystals melting at 125°–128° C.

EXAMPLE 3

O-(2,4,6-Tri-tert-butylphenyl) phenylphosphonochloridite

A dispersion of potassium 2,4,6-tri-tert-butylphenolate was prepared using the procedure of Example 2 starting from 21.6 grams of 2,4,6-tri-tert-butylphenol, 9.7 grams of a 46.3% aqueous potassium hydroxide solution and 250 ml of toluene.

The above dispersion was cooled to 10° C. and 14.8 grams of dichlorophenylphosphine was added dropwise over a 7-minute period at 10° to 15° C. The reaction mixture was stirred for 19 hours and the potassium chloride formed was separated by filtration. The crude product was isolated as a residue following removal of the toluene by distillation under vacuum. The above named compound was isolated as white crystals melting at 97°–99° C. after trituration of the crude product with acetonitrile and then recrystallization.

EXAMPLE 4

O-(2,4-Di-tert-butylphenyl)-O'-(2,4,6-tri-tert-butylphenyl) phenylphosphonite

The above named product was prepared by the general method of Example 2 when an equivalent amount of the product of Example 3 was substituted for the product of Example 1. The desired product was isolated as white crystals melting at 120°–123° C.

EXAMPLE 5

O-(2,6-Di-tert-butyl-4-methylphenyl)-O'-(2,6-di-tert-butyl-4-carbomethoxyphenyl) phenylphosphonite A solution of 21.7 grams of the compound of Example 1 in 50 ml of toluene was added at 20°–25° C. over a 8-minute period to a solution of methyl 3,5-di-tert-butyl-4-hydroxy-benzoate in 60 ml of triethylamine. After heating at 80°–85° C. for 7 hours and refluxing for another 7 hours 15 ml of N,N-dimethylformamide was added to accelerate the reaction. Heating was continued for another 7 hours at 106°–108° C. The volatiles present were then removed by vacuum distillation and the residue formed was freed of triethylamine hydrochloride by adding 100 ml of toluene followed by filtration. The filtrate was successively washed with water, saturated aqueous sodium bicarbonate and water. After drying over anhydrous sodium sulfate, the toluene was then removed and the isolated residue crystallized from a mixture of acetonitrile and isoprophanol to give the above named product as white crystals melting at 138°–141° C.

EXAMPLE 6

O-[2,6-Di-tert-butyl-4-(2-carbomethoxyethyl)phenyl] phenylphosphonochloridite

When using the procedure of Example 1, an equivalent amount of methyl 3,5-di-tert-butyl-4-hydroxyhydrocinnamate was substituted for 2,6-di-tert-butyl-p-cresol, the above-named compound was obtained as white crystals melting at 86°–88° C.

EXAMPLE 7

O-[2,6-Di-tert-butyl-4-(2-carbomethoxyethyl)phenyl]-O'-(4-tert-butylphenyl) phenylphosphonite A solution of 19.5 grams of the compound of Example 6 in 40 ml of dry benzene was added dropwise rapidly at 25°–30° C. to a solution of 6.75 grams of p-tert-butylphenol and 4.65 grams of triethylamine in 40 ml of benzene. The reaction mixture was heated at 65° C. for 3 hours. The triethylamine hydrochloride formed was removed by filtration and the clear filtrate was concentrated by vacuum distillation. The crude residue formed was dissolved in hexane and the solution was successively washed with 2N aqueous sodium hydroxide and water and finally dried over anhydrous sodium sulfate. After filtration and removal of solvent in vacuo, the residue was recrystallized from isopropanol as white crystals melting at 69°–71° C.

EXAMPLE 8

O-(2,6-Di-tert-butyl-4-methylphenyl)-O'-(4-tert-butylphenyl) phenylphosphonite

The above-named compound was made according to the procedure of Example 7, when an equivalent amount of the phenylphosphonochloridite of Example 1 was substituted for the phenylphosphonochloridite of Example 6, as white crystals melting at 101°–103° C.

EXAMPLE 9

O-(4-tert-Butylphenyl)-O'-(2,4,6-tri-tert-butylphenyl) phenylphosphonite

The above-named compound was prepared by the procedure of Example 2 by substituting an equivalent amount of the compound of Example 3 for that of Example 1 and replacing 2,4-di-tert-butylphenol with an equivalent amount of p-tert-butylphenol. The product was isolated as a viscous liquid boiling at 198° C./0.07 mm Hg.

EXAMPLE 10

O-(2-tert-Butyl-4-methylphenyl)-O'-(2,6-di-tert-butyl-4-methylphenyl) phenylphosphonite The above-named compound was prepared by the general procedure of Example 2 by substituting an equivalent amount of the 2-tert-butyl-p-cresol for 2,4-di-tert-butylphenol. The product was isolated as white crystals melting at 108°–111° C.

EXAMPLE 11

O-(2,6-Di-tert-butylphenyl) phenylphosphonochloridite

This compound is made by the general procedure of Example 1 by replacing 2,6-di-tert-butyl-p-cresol with an equivalent amount of 2,6-di-tert-butylphenol.

EXAMPLE 12

O-(2,6-Di-tert-butylphenyl)-O'-(2,4-di-tert-butylphenyl) phenylphosphonite

The above-named compound is made by the general method of Example 2 by replacing the compound of Example 1 with an equivalent amount of the phenylphosphonochloridite of Example 11.

EXAMPLE 13

O-(2-tert-Butyl-4,6-dimethylphenyl) phenylphosphonochloridite

The above-named compound is made by the general procedure of Example 1 by replacing 2,6-di-tert-butyl-p-cresol with an equivalent amount of 2-tert-butyl-4,6-dimethylphenol.

EXAMPLE 14

O-(2-tert-Butyl-4,6-dimethylphenyl)-O'-(2,4-di-tert-butylphenyl) phenylphosphonite The above-named compound is prepared by the general procedure of Example 7 by replacing the phenylphosphonochloridite of Example 6 with an equivalent amount of the compound of Example 13 and p-tert-butylphenol by an equivalent amount of 2,4-di-tert-butylphenol.

EXAMPLE 15

Phenylphosphonous acid monoester of methyl 3,5-di-tert-butyl-4-hydrohydrocinnamate To a solution of 40.9 grams of methyl 3,5-di-tert-butyl-4-hydroxyhydrocinnamate in 70.7 grams of triethylamine was added dropwise at 23°-25° C. 12.5 grams of dichlorophenylphosphine. The reaction mixture was heated for 12 hours at 75°-80° C. and then poured onto chopped ice containing 60 grams of concentrated hydrochloric acid. This mixture was stirred until all the ice had melte,d, and was then extracted with benzene. The benzene phase was washed with water and the repeatedly with saturated sodium bicarbonate solution till the benzene showed no halogen to be present according to a Beilstein test. After removal of the benzene solvent from the dried benzene phase, the residue was topped at 125°-152° C/0.20 mm Hg to remove unreacted methyl 3,5-di-tert-butyl-4-hydroxyhydrocinnamate. The remaining residue was recrystallized from cyclohexane and hexane to give the above-named product as white crystals melting at 87°-90° C.

EXAMPLE 16

0-(2,4,6-Tri-tert-butylphenyl) phenylphosphonite 17.9 grams of dichlorophenylphosphine was added dropwise at 10°-15° C. over a 5-minute period to a solution of 26.2 grams of 2,4,6-tri-tert-butylphenol and 10.1 grams of triethylamine in 100 ml of toluene. The reaction mixture was heated at 80°-85° C. for 24 hours, cooled to room temperature and freed of triethylamine hydrochloride by filtration. After washing with 6N hydrochloric acid and then water, the toluene layer was concentrated under vacuum. The residue formed was crystallized successively from acetonitrile and n-hexane to give white crystals melting at 156°-158° C.

EXAMPLE 17

0,0'-Bis(2,6-di-tert-butyl-4-carbomethoxyphenyl) phenylphosphonite

To a slurry of 26.4 grams of methyl 3,5-di-tert-butyl-4-hydroxybenzoate in 50.5 grams of triethylamine was added dropwise at 25°-30° C. 8.95 grams of dichlorophenylphosphine. The reaction mixture was then heated at 65° for 4 hours by which time the mixture became very viscous. To aid stirring 90 ml of toluene was added and the reaction mixture was heated at 65°-70° C. for 25 hours more. The reaction mixture was then poured into a rapidly stirred mixture of 300 grams of chopped ice and 50 grams of concentrated hydrochloric acid. After the ice had melted, the separated aqueous layer was extracted with toluene. The combined toluene phases were successively washed with water, saturated sodium bicarbonate solution and water and then dried over anhydrous sodium sulfate. After removal of the toluene in vacuo, the isolated residue was recrystallized from a solvent mixture of 250 ml of acetonitrile and 30 ml of benzene to yield white crystals melting at 168°-171° C.

EXAMPLE 18

0,0'-Bis-[2,6-di-tert-butyl-4-(carbo-2,4-di-tert-butylphenoxy)phenyl] phenylphosphonite The above-named compound was prepared by the general procedure of Example 17 by replacing methyl 3,5-di-tert-butyl-4-hydroxybenxoate with an equivalent amount of 2,4-di-tert-butylphenyl 2,6-di-tert-butyl-4-hydroxybenzoate. The product was obtained as white crystals melting at 229°-231° C.

EXAMPLE 19

0,0'-Bis-(2-tert-butyl-4,6-dimethylphenyl) phenylphosphonite

The above-named compound was made by the general procedure of Example 17, by replacing methyl 3,5-di-tert-butyl-4-hydroxybenzoate by an equivalent amount of 2-tert-butyl-4,6-dimethylphenol, as a liquid boiling at 170° C./0.01 mm Hg.

EXAMPLE 20

0,0'-Bis-[2-tert-butyl-4-(2-carbomethoxyethyl)-6-methylphenyl] phenylphosphonite The above-named product is made by the general procedure of Example 17 by replacing methyl 3,5-di-tert-butyl-4-hydroxybenzoate by an equivalent amount of methyl 2-tert-butyl-4-hydroxy-6-methylhydrocinnamate.

EXAMPLE 21

0,0'-Bis-[2,4,6-triisopropylphenyl) phenylphosphonite]

The above-named compound was prepared following the general procedure of Example 17 by replacing methyl 3,5-di-tert-butyl-4-hydroxybenzoate by an equivalent amount of 2,4,6-tri-isopropylphenol. The product had a melting point of 75° C.

EXAMPLE 22-28

Other compounds of Formula I may be prepared by the general procedure of Examples 2,5,7 or 17.

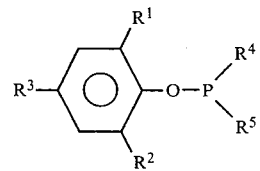

| Example | R1 | R2 | R3 | R4 | R5 |
|---|---|---|---|---|---|
| 22 | t-Bu | t-Bu | Me | phenyl | t-Bu–⟨○⟩–O– (with Me, t-Bu substituents) |
| 23 | t-Bu | t-Bu | t-Bu | phenyl | t-Bu–⟨○⟩–O– (with t-Bu, t-Bu substituents) |
| 24 | t-Bu | t-Bu | —COOMe | n-dodecyl | MeOCO–⟨○⟩–O– (with t-Bu, t-Bu substituents) |
| 25 | t-Bu | t-Bu | —COO–⟨○⟩–t-Bu (with tBu) | n-octadecyl | t-Bu–⟨○⟩–OCO–⟨○⟩–O– (with t-Bu, t-Bu, t-Bu substituents) |
| 26 | t-Bu | t-Bu | —C$_{18}$H$_{37}$ | methyl | OH |
| 27 | t-Bu | t-Bu | —COOC$_{18}$H$_{37}$ | phenyl | t-Bu–⟨○⟩–O– (with t-Bu, t-Bu substituents) |
| 28 | t-Bu | t-Bu | Me | phenyl | t-Bu–⟨○⟩–O– (with t-Bu, t-Bu substituents) | t-Bu = tert-butyl
Me = methyl

EXAMPLE 29

0,0′-Bis-(2,6-di-tert-butyl-4-methylphenyl) phenylphosphonite 48.5 grams of 2,6-di-tert-butyl-4-methylphenol, 27.3 grams of 45.3% aqueous potassium hydroxide and 300 ml of toluene were refluxed at 108°–111° C. for about 5 hours while removing both bulk water and reaction water from the toluene-water azeotrope. 17.9 grams of phenyldichlorophosphine was added to the cooled white slurry at 11° C. and the reaction mixture was stirred at room temperature for 2 hours. 3 ml of dry N,N-dimethylformamide was added and the mixture stirred overnight at room temperature and then at 50° C. for 3 hours. After adding 250 ml of water to the reaction mixture, the green color was discharged by the addition of 3 ml of acetic acid. The separated toluene phase was then washed with water and dried over sodium sulfate. The crude product, obtained by distillation of the toluene, was triturated with isopropanol to give white crystals which after recrystallization from isopropanol melted at 181°–183° C.

EXAMPLE 29(a)

0,0′-Bis(2,4,6-tri-tert-butylphenyl) phenylphosphonite

The above-named compound, which melted at 218°–220° C., was made by the general procedure of Example 29 by substituting ,2,4,6-tri-tert-butylphenol for an equivalent amount of 2,6-tert-butyl-4-methylphenol.

EXAMPLE 30

0-(2,4-Di-tert-butylphenyl) phenylphosphonochloridite 16.5 grams of 2,4-di-tert-butylphenol and 14.8 grams of phenyldichlorophosphine were heated together in an atmosphere of dry nitrogen at 80°–90° C. over a period of 3 hours. Volatiles were removed at 40°–50° C. at 0.2 mm Hg and the product was distilled at 160°–165° C./1–5 μ. The product crystallized to a white solid melting at 68°–70° C.

EXAMPLE 31

0-(2,6-Di-tert-butyl-4-methylphenyl)-0′-(2,4-di-tert-butylphenyl) phenylphosphonite 3.9 grams of 45.3% aqueous potassium hydroxide and 7.0 grams of 2,6-di-tert-butyl-4-methylphenol was charged to 60 ml of toluene and heated at reflux with stirring till 2.7 ml of water was collected. 11.0 grams of the compound of Example 30 dissolved in 20 ml of toluene was added dropwise at −10° C. over a 10-minute period. The reaction mixture was stirred at −10° C. for 1 hour and allowed to warm to room temperature. 10 ml of dry dimethylformamide was added to the milky dispersion and the system was stirred overnight. The precipitated potassium chloride was removed by filtration, and all volatiles were removed by distillation. The dry residue was dissolved in 26 ml of isopropanol and isolated as a white crystalline solid melting at 126°–128° C. Infrared spectroscopy and thin layer chromatography showed the material to be identical to that prepared in Example 2.

EXAMPLE 32

Water Pickup at 80% Relative Humidity

In order to measure the water pickup of the instant compounds, a 200 mg sample of a phosphonite was weighed into a Petri dish of 5 cm diameter and 1.5 cm wall height. The sample in the dish was then placed in a glass chamber containing an aqueous solution of 141.5 grams of ammonium chloride in 386.5 ml of water which provided an atmosphere of 80% relative humidity at room temperature.

The water pickup was determined by periodically weighing the dish and sample. Any change in the physical state of the sample was also noted. Finally the chemical products formed are qualitatively determined by running an infrared spectrum on a 1% solution of the products in carbon tetrachloride. The samples were also analyzed by thin layer chromatography using glass plates coated with silica gel F-254 made commercially by E. Merck AG, Darmstadt, Germany. Results are given on the following table:

| Compound of Example | % Gain By Weight | Days at 80% RH | Remarks |
|---|---|---|---|
| 2 | 0 | 20 | |
|   | 0.1 | 49 | little or no hydrolysis |
| 4 | 0.2 | 14 | |
|   | 0.2 | 32 | |
|   | 0.6 | 46 | |
|   | 0.5 | 53 | |
|   | 0.5 | 62 | little or no hydrolysis |
| 7 | 3.3 | 21 | almost completely hydrolyzed |
| 8 | 1.8 | 18 | some hydrolysis |
| 17 | 0.5 | 20 | |
|   | 0.2 | 57 | little or no hydrolysis |

EXAMPLE 33

Processing Stability of Polypropylene at 500° F. (260° C.)

The base formulation comprises 100 parts of unstabilized polypropylene (Profax 6801, Hercules) with 0.10 parts of calcium stearate. The test stabilizer were solvent blended into the polypropylene from solutions in methylene chloride. After removal of the solvent by evaporation under reduced pressure, the stabilized resin formulation was extruded at 100 rpm from a 1 inch (2.54 cm) diameter extruder under the following extruder conditions:

| Extruder Location | Temperature °F. | °C. |
|---|---|---|
| Cylinder #1 | 450 | 232 |
| Cylinder #2 | 475 | 246 |
| Cylinder #3 | 500 | 260 |
| Die #1 | 500 | 260 |
| Die #2 | 500 | 260 |

During extrusion, the internal extruder pressure was determined using a pressure transducer. After each of the first, third and fifth extrusions, resin pellets were compression molded into 125 mil (3.2 mm) thick plaques at 380° F. (193° C.) and specimen yellowness index (YI) was determined according to ASTM D1925-63T. Low YI values indicate less yellowing.

The melt flow rate was determind by ASTM method 1238 Condition L. The melt flow rate varies inversely as the transducer pressure and both are relative measures of the molecular weight of the polypropylene. High melt flow rates indicate lower polymer molecular weights and indicate that polymer degradation may be occurring. Thus, if melt flow rate after the fifth extrusion shows minimum change from that after the first extrusion and if transducer pressure after the fifth is nearly as high as after the first extrusion, the polypropylene is being well stabilized by the given stabilization formulation.

Results are seen in Tables I–II.

The instant compounds, particularly compounds of Examples 2, 4 and 7, not only stabilized polypropylene well against degradation as seen by transducer pressure measurements, but also against discoloration as well.

Table I

| | | Processing Stability of Polypropylene at 500° F. (260° C.) | | | | | | | | |
|---|---|---|---|---|---|---|---|---|---|---|
| Stabilizer | Conc. Stabilizer % by wt. | Transducer Pressure after Extrusion psi/(Kg/cm$^2$) | | | Melt Flow Rate after Extrusion grams/10 minutes | | | Yellowness Index Color after Extrusion | | |
| | | 1 | 3 | 5 | 1 | 3 | 5 | 1 | 3 | 5 |
| Base formulation | — | 1050/73.5 | 705/49.3 | 525/26.9 | — | — | — | 3.3 | 4.3 | 5.2 |
| IRGANOX 1010* | 0.1 | 1170/82.0 | 975/68.2 | 852/59.6 | — | — | — | 4.5 | 7.6 | 8.8 |
| IRGANOX 1010* (0.1%) plus | | | | | | | | | | |
| Compound Ex 8 | 0.05 | 1325/92.7 | 1230/86.1 | 1090/76.4 | 0.16 | 0.33 | 0.67 | 5.2 | 6.2 | 8.1 |
| Compound Ex 7 | 0.05 | 1345/94.2 | 1250/87.5 | 1170/82.0 | 0.16 | 0.27 | 0.47 | 4.5 | 5.5 | 7.0 |
| Compound Ex 2 | 0.05 | 1350/94.5 | 1265/88.5 | 1175/82.2 | 0.15 | 0.26 | 0.50 | 4.1 | 5.9 | 7.4 |
| Compound Ex 17 | 0.05 | 1320/92.5 | 1200/84.0 | 1095/76.6 | — | — | — | 5.3 | 7.9 | 11.0 |
| Compound Ex 18 | 0.05 | 1270/89.0 | 1130/79.0 | 1010/70.7 | — | — | — | 3.6 | 6.1 | 8.9 |

*IRGANOX 1010 = neopentanetetrayl tetrakis(3,5-di-tert-butyl-4-hydroxyhydrocinnamate)

Table II

| | | Processing Stability of Polypropylene at 500° F. (260° C.) | | | | | | | | |
|---|---|---|---|---|---|---|---|---|---|---|
| Stabilizer | Conc. Stabilizer % by wt. | Transducer Pressure after Extrusion psi/(Kg/cm$^2$) | | | Melt Flow Rate after Extrusion grams/10 minutes | | | Yellowness Index Color after Extrusion | | |
| | | 1 | 3 | 5 | 1 | 3 | 5 | 1 | 3 | 5 |
| Base formulation | — | 1020/ | 790/55.3 | 640/44.8 | 0.75 | 1.78 | 3.25 | 5.3 | 7.4 | 9.3 |
| IRGANOX 1010* | 0.1 | 1130/79.0 | 980/68.5 | 870/60.9 | 0.30 | 0.67 | 1.10 | 9.0 | 12.2 | 14.7 |
| IRGANOX 1010* (0.1% plus | | | | | | | | | | |
| Compound Ex 4 | 0.05 | 1305/91.2 | 1200/84.0 | 1125/78.7 | 0.17 | 0.24 | 0.32 | 5.5 | 7.4 | 9.3 |

*IRGANOX 1010 = neopentanetetrayl tetrakis(3,5-di-tert-butyl-4-hydroxyhydrocinnamate)

EXAMPLE 34

Processing Stability of Polypropylene at 550° F. (288° C.)

Using the general procedure of Example 31, the processing stability of polypropylene was tested at 550° F. (305° C.) using a laboratory extruder operated at 110 rpm and with the extruder conditions below:

| Extruder Location | Temperature °F. | °C. |
|---|---|---|
| Cylinder #1 | 500 | 260 |
| Cylinder #2 | 525 | 274 |
| Cylinder #3 | 550 | 288 |
| Die #1 | 550 | 288 |
| Die #2 | 550 | 288 |

Results are given in Table III.

The compounds of Example 2 exhibited excellent stabilization efficacy in this test.

Table III

| | | Processing Stability of Polypropylene at 550° F. (288° C.) | | | | | | | |
|---|---|---|---|---|---|---|---|---|---|
| | Conc. Stabilizer | Transducer Pressure after Extrusion psi/(Kg/cm²) | | | Melt Flow Rate after Extrusion grams/10 minutes | | | Yellowness Index Color after Extrusion | | |
| Stabilizer | % by wt. | 1 | 3 | 5 | 1 | 3 | 5 | 1 | 3 | 5 |
| Base formulation | — | 765/53.5 | 360/25.2 | 225/15.7 | 1.63 | 9.40 | 20.60 | 4.3 | 4.8 | 5.8 |
| IRGANOX 1010* | 0.1 | 925/64.7 | 670/46.9 | 525/36.9 | 0.68 | 1.60 | 3.25 | 4.7 | 7.6 | 10.1 |
| Compound Ex 2 | 0.1 | 1155/80.7 | 1020/71.4 | 910/63.7 | 0.21 | 0.42 | 0.70 | 5.6 | 7.5 | 9.8 |

*IRGANOX 1010 = neopentanetetrayl tetrakis(3,5-di-tert-butyl-4-hydroxyhydrocinnamate)

EXAMPLE 35

Processing Stability of High Molecular Weight-High Density Polyethylene at 600° F. (316° C.)

Using the general procedure of Example 33, the processing stability of high molecular weight-high density polyethylene (Union Carbide (10780-64A) having a nominal melt flow rate of 5.0 grams/10 minutes was measured.

Results are given on Table IV.

The compound of Example 2 exhibited excellent stabilization against discoloration for the polyethylene in this test.

of each), 5 mil (0.127 mm) films of polypropylene (Profax 6801, Hercules) containing 0.3% by weight of the test stabilizer were mounted on 3"×2" (7.62 cm×5.08 cm), infrared card holders with 1"×¼" (2.54 cm×0.635 cm) windows and placed on a rotating drum 2 inches (5.08 cm) from the tubes in the FS/BL unit. The time in hours required for development of 0.5 carbonyl absorbance units in the test films as determined by infrared spectroscopy was noted. The development of carbonyl groups in the polypropylene is proportional to the amount of degradation caused by the ultraviolet light exposure.

The test results are given on Table V.

The instant compounds, particularly the compound of Example 18, provided good stabilization against light degradation of polypropylene in this test.

Table V

| Stabilizer (0.3% by weight) | Hours to Failure (Development 0.5 carbonyl absorbance unit) |
|---|---|
| None | 200 |
| Compound Ex 2 | 590 |
| Compound Ex 4 | 770 |
| Compound Ex 7 | 490 |
| Compound Ex 8 | 520 |
| Compound Ex 18 | 1010 |

EXAMPLE 37

Stabilization of Polyethylene Terephthalate

1% of the compound of Example 2 is added as a stabilizer to molten polyethylene terephthalate at 270° C. with stirring under a nitrogen atmosphere. The resulting formulated polymer is ground with solid carbon Table IV

| | | Processing Stability of High Molecular Weight-High Density Polyethylene at 600° F. (316° C.) | | | | | | | | |
|---|---|---|---|---|---|---|---|---|---|---|
| | Conc. Stabilizer | Transducer Pressure after Extrusion psi/(Kg/cm²) | | | Melt Flow Rate after Extrusion grams/10 minutes | | | Yellowness Index Color after Extrusion | | |
| Stabilizer | % by wt. | 1 | 3 | 5 | 1 | 3 | 5 | 1 | 3 | 5 |
| None | — | 1035/72.4 | 1065/74.5 | 1050/73.5 | 3.8 | 3.1 | 2.9 | −0.7 | 1.2 | 1.9 |
| IRGANOX 1076* | 0.1 | 1060/74.1 | 1050/73.5 | 1035/72.4 | 4.4 | 4.1 | 4.0 | −1.2 | 2.5 | 3.5 |
| IRGANOX 1076* (0.1%) plus | | | | | | | | | | |
| Compound Ex 2 | 0.05 | 1120/78.4 | 1120/78.4 | 1110/77.6 | 4.8 | 3.9 | 3.5 | −3.4 | −1.3 | −1.1 |
| IRGANOX 1010** | 0.1 | 1065/74.5 | 1050/73.5 | 1020/71.4 | 4.4 | 4.1 | 4.2 | −0.8 5.7 | 9.5 | |
| IRGANOX 1010** (0.1%) plus | | | | | | | | | | |
| Compound Ex 2 | 0.05 | 1080/75.6 | 1065/74.5 | 1050/73.5 | 4.9 | 4.5 | 4.2 | −3.6 | 0.7 | 2.8 |

*IRGANOX 1076 = n-octadecyl 3,5-di-tert-butyl-4-hydroxyhydrocinnamate
**IRGANOX 1010 = neopentanetetrayl tetrakis(3,5-di-tert-butyl-4-hydroxyhydrocinnamate)

EXAMPLE 36

LIGHT STABILIZATION OF POLYPROPYLENE

Using an FS/BL radiation unit consisting of 40 tubes of alternating fluorescent sunlamps and black lights (20 dioxide until the particle size is less than 100 microns in diameter. The temperature at which the onset of oxidation takes place is then determined as follows:

About 1 milligram of the polyester powder, as prepared above, is charged into the chamber of the Perkin-Elmer Differential Scanning Calorimeter and heated under nitrogen till a temperature of 225° C. is reached. The nitrogen flow is stopped and oxygen is introduced at a rate of 15 ml per minute while heating at a rate of 1 degree per minute until the oxidation exotherm is recorded. The oxidation temperature of the formulated powder is thus determined to be higher than that of the base polyester powder without the stabilizer. The higher oxidation temperature provided by the stabilizer clearly shows the marked improvement in inhibition of oxidation of the polyester. The color of the stabilized polyester is also improved compared to that without the additive.

EXAMPLE 38

Stabilization of Acrylonitrile - Butadiene - Styrene (ABS)

ABS resin is prepared by heating at 80° C. for 7.5 hours the following formulations:

| Resin A: | butadiene | 10 | parts |
|---|---|---|---|
| | acrylonitrile | 24 | |
| | styrene | 65.8 | |
| | 2,2′-azobisisobutyronitrile | 0.1 | |
| | | 99.9 | parts |

Resin B: This resin is prepared in the same manner as Resin A except that it contains additionally 0.25% of the stabilizer.

The oxidation temperature of each of the resins is determined by differential Scanning Calorimetry (DSC) employing the following procedure:

10 mg is charged to the DSC pan and heated from ambient temperature at a rate of 20° C./minute in an oxygen stream flowing at the rate of 250 ml/minute. The temperature at which an exotherm is observed for each of the resins is recorded.

Samples of ABS resins each made with 0.25% of a stabilizer of Examples 1, 2, 4, 7, 8, 9 and 14 all exhibit an exotherm at a higher temperature than does the corresponding ABS resins containing no stabilizer indicating higher thermal stability for the stabilized resins.

EXAMPLE 39

Stabilization of Polycarbonate

Polycarbonate (Lexan, General Electric) is formulated by mixing the base resin in a Waring Blender with 1.0% the compound of Example 12, the base resin also containing 0.1% of octadecyl 3,5-di-t-butyl-4-hydroxyhydrocinnamate. The formulated resin is compression molded, cut into chips and charged into a standard melt index apparatus. After maintaining at 350° C. for 30 minutes, a sample is removed, compressed into plaques and examined for color. The sample containing both stabilizers is much lighter in color than that containing only octadecyl 3,5-di-t-butyl-4-hydroxyhydrocinnamate.

What is claimed is:

1. A compound of the formula

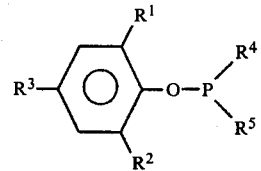

wherein
$R^1$ is branched alkyl of 3 to 8 carbon atoms, benzyl, α-methylbenzyl or α,α-dimethylbenzyl,
$R^2$ is alkyl of 1 to 18 carbon atoms, benzyl, α-methylbenzyl or α,α-dimethylbenzyl.
$R^3$ is hydrogen, alkyl of 1 to 18 carbon atoms, carboalkoxy of 2 to 19 carbon atoms, carboalkoxyalkyl of 3 to 24 carbon atoms, carbophenoxy, carbophenoxyalkyl of 8 to 16 carbon atoms; or said carbophenoxy or said carbophenoxyalkyl with the phenoxy substituted with 1 to 3 alkyl groups with 1 to 8 carbon atoms in each alkyl group,
$R^4$ is alkyl of 1 to 18 carbon atoms, phenyl or phenyl substituted by 1 to 3 alkyl groups with 1 to 8 carbon atoms in each alkyl group,
$R^5$ is halogen, —XH or —$XR^6$,
X is O or S,
$R^6$ is phenyl, substituted by alkyl, having the formula

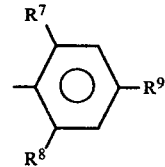

$R^7$ is hydrogen, branched alkyl of 3 to 18 carbon atoms, benzyl, α-methylbenzyl or α,α-dimethylbenzyl,
$R^8$ is hydrogen, alkyl of 1 to 18 carbon atoms, benzyl, α-methylbenzyl or α,α-dimethylbenzyl, and
$R^9$ is hydrogen, alkyl of 1 to 18 carbon atoms, carboalkoxy of 2 to 19 carbon atoms, carboalkoxyalkyl of 3 to 24 carbon atoms, carbophenoxy, carbophenoxyalkyl of 8 to 16 carbon atoms; or said carbophenoxy or said carbophenoxyalkyl with the phenoxy substituted with 1 to 3 alkyl groups with 1 to 8 carbon atoms in each alkyl group.

2. A compound according to claim 1 wherein
$R^1$ is branched alkyl of 4 to 12 carbon atoms, α-methyl-benzyl or α,α-dimethylbenzyl,
$R^2$ is alkyl of 3 to 12 carbon atoms, α-methylbenzyl or α,α-dimethylbenzyl,
$R^3$ is hydrogen, alkyl of 1 to 18 carbon atoms, carboalkoxy of 2 to 19 carbon atoms, carboalkoxyalkyl of 3 to 21 carbon atoms or carbophenoxy with the phenoxy substituted with 1 to 3 alkyl groups with 1 to 8 carbon atoms in each alkyl group,
$R^4$ is alkyl of 1 to 18 carbon atoms, phenyl or phenyl substituted by 1 to 3 alkyl groups with 1 to 8 carbon atoms in each alkyl group,
$R^5$ is chlorine or —$XR^6$,
X is O,
$R^7$ is hydrogen, branched alkyl of 4 to 12 carbon atoms, α-methylbenzyl or α,α-dimethylbenzyl, R⁸ is hydrogen, alkyl of 1 to 12 carbon atoms, α-methylbenzyl or α,αdimethylbenzyl, and R⁹ is hydrogen, alkyl of 1 to 18 carbon atoms, carboalkoxy of 2 to 19 carbon atoms, carboalkoxyalkyl of 3 to 21 carbon atoms or carbophenoxy with the phenoxy substituted with 1 to 3 alkyl groups with 1 to 8 carbon atoms in each alkyl group, with the proviso that all of R⁷, R⁸ and R⁹ cannot be hydrogen at the same time.

3. A compound according to claim 1 wherein
R¹ is tertiary alkyl of 4 to 8 carbon atoms,
R² is branched alkyl of 4 to 8 carbon atoms,
R³ is hydrogen, alkyl of 1 to 9 carbon atoms, carboalkoxy of 2 to 9 carbon atoms, carboalkoxyalkyl of 3 to 11 carbon atoms or carbophenoxy with the phenoxy substituted with 1 to 3 alkyl groups with 1 to 4 carbon atoms in each alkyl group,
R⁴ is phenyl or phenyl substituted by 1 to 3 alkyl groups with 1 to 4 carbon atoms in each alkyl group,
R⁵ is chlorine or —XR⁶,
X is O,
R⁷ is tertiary alkyl of 4 to 8 carbon atoms,
R⁸ is hydrogen or alkyl of 1 to 8 carbon atoms, and
R⁹ is hydrogen, alkyl of 1 to 9 carbon atoms, carboalkoxy of 2 to 9 carbon atoms, carboalkoxyalkyl of 3 to 11 carbon atoms or carbophenoxy with the phenoxy substituted with 1 to 3 alkyl groups with 1 to 4 carbon atoms in each alkyl group.

4. A compound according to claim 1 wherein
R¹ is isopropyl or tert-butyl,
R² is alkyl of 1 to 4 carbon atoms,
R³ is hydrogen, alkyl of 1 to 18 carbon atoms, —CH₂CH₂COOCH₃, —COOCH₃, —COOC₁₈H₃₇ or

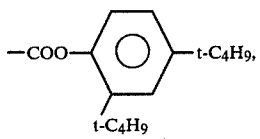

R⁴ is alkyl of 1 to 18 carbon atoms or phenyl,
R⁵ is chlorine, —XH or XR⁶,
X is O,

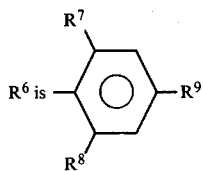

R⁷ is hydrogen, isopropyl or tert-butyl,
R⁸ is hydrogen or alkyl of 1 to 4 carbon atoms, and
R⁹ is alkyl of 1 to 4 carbon atoms, —COOCH₃, —CH₂CH₂COOCH₃ or

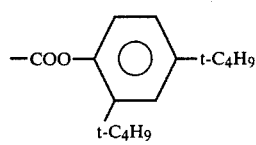

with the proviso that both R⁷ and R⁸ cannot be hydrogen at the same time.

5. The compound according to claim 1 which is O-(2,6-di-tert-butyl-4-methylphenyl)-O'-2,4-di-tert-butylphenyl) phenylphosphonite.

6. The compound according to claim 1 which is O-(2,4-di-tert-butylphenyl)-O'-(2,4,6-tri-tert-butylphenyl) phenylphosphonite.

7. The compound according to claim 1 which is O-[2,6-di-tert-butylphenyl-4-(2-carbomethoxyethyl)-phenyl]- O'-(4-tert-butylphenyl) phenylphosphonite.

8. The compound according to claim 1 which is O-(2,6-di-tert-butyl-4-methylphenyl)-O'-(4-tert-butylphenyl) phenylphosphonite.

9. The compound according to claim 1 which is O,O'-bis(2,6-di-tert-butyl-4-carbomethoxyphenyl) phenylphosphonite.

10. The compound according to claim 1 which is O,O'-bis-[2,6-di-tert-butyl-4-(carbo-2,4-di-tert-butylphenoxy)-phenyl] phenylphosphonite.

11. A composition of matter comprising an organic polymer subject to oxidative, thermal or actinic degradation stabilized with from 0.01 to 5% by weight of a compound according to claim 1.

12. A composition according to claim 11 wherein the polymer is a polyolefin homopolymer or copolymer.

13. A composition according to claim 12 stabilized with O-(2,6-di-tert-butyl-4-methylphenyl)-O'-(2,4-di-tert-butylphenyl) phenylphosphonite, O-(2,4- tert-butylphenyl)-O'-(2,4,6-tri-tert-butylphenyl) phenylphosphonite or O,O'-bis [2,6-di-tert-butyl-4-(carbo-2,4-di-tert-butylphenoxy)phenyl] phenylphosphonite.

14. A compound of the formula

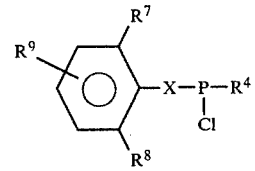

wherein
R⁴ is alkyl of 1 to 18 carbon atoms, phenyl or phenyl substituted by 1 to 3 alkyl groups with 1 to 8 carbon atoms in each alkyl group,
X is O or S,
R⁷ is hydrogen, branched alkyl of 3 to 18 carbon atoms, benzyl, α-methylbenzyl or α,α-dimethylbenzyl,
R⁸ is hydrogen, alkyl of 1 to 18 carbon atoms, benzyl, α-methylbenzyl or α,α-dimethylbenzyl, and
R⁹ is hydrogen, alkyl of 1 to 18 carbon atoms, carboalkoxy of 2 to 19 carbon atoms, carboalkoxyalkyl of 3 to 24 carbon atoms, carbophenoxy, carbophenoxyalkyl of 8 to 16 carbon atoms; or carbophenoxy or carbophenoxyalkyl with the phenoxy substituted with 1 to 3 alkyl groups with 1 to 18 carbon atoms in each alkyl group,
with the proviso that all of R⁷, R⁸ and R⁹ cannot be hydrogen at the same time.

15. A compound according to claim 14 wherein
R⁴ is alkyl of 1 to 8 carbon atoms, phenyl or phenyl substituted by 1 to 3 alkyl groups with 1 to 8 carbon atoms in each alkyl group,
X is O,
R⁷ is hydrogen, branched alkyl of 4 to 12 carbon atoms, α-methylbenzyl or α,α-dimethylbenzyl, $R^8$ is hydrogen, alkyl of 1 to 12 carbon atoms, α-methylbenzyl or α,α-dimethylbenzyl, and $R^9$ is hydrogen, alkyl of 1 to 18 carbon atoms, carboalkoxy of 2 to 19 carbon atoms, carboalkoxyalkyl of 3 to 21 carbon atoms or carboxyphenoxy with the phenoxy substituted with 1 to 3 alkyl groups with 1 to 8 carbon atoms in each alkyl group, with the proviso that all of $R^7$, $R^8$ and $R^9$ cannot be hydrogen at the same time.

16. A compound according to claim 14 wherein $R^4$ is phenyl or phenyl substituted by 1 to 3 alkyl groups with 1 to 4 carbon atoms in each alkyl group, X is O, $R^7$ is tertiary alkyl of 4 to 8 carbon atoms, $R^8$ is hydrogen or alkyl of 1 to 8 carbon atoms, and $R^9$ is hydrogen, alkyl of 1 to 9 carbon atoms, carboalkoxy of 2 to 9 carbon atoms, carboalkoxyalkyl of 3 to 11 carbon atoms, or carbophenoxy with the phenoxy substituted with 1 to 3 alkyl groups with 1 to 4 carbon atoms in each alkyl group.

17. The compound according to claim 14 which is O-(2,4-di-tert-butylphenyl) phenylphosphonochloridite.

18. The compound according to claim 1 which is O,O'-bis(2,6-di-tert-butyl-4-methylphenyl) phenylphosphonite.

19. The compound according to claim 1 which is O,O'-bis(2,4-tri-tert-butylphenyl) phenylphosphonite.

20. A composition according to claim 11 wherein the polymer is selected from the group consisting of polyethylene, polypropylene, polyisobutylene, poly(butene-1), poly(pentene-1), poly(3-methylbutene-1), poly(4-methylpentene-1), ethylene/propylene copolymer, polystyrene, ABS resin, SBR, polyisoprene, polyethylene terephthalate, polybutylene terephthalate, polyurethane, polycarbonate, nylon 6, nylon 6-6 and polysulfone.

* * * * *

UNITED STATES PATENT AND TRADEMARK OFFICE
CERTIFICATE OF CORRECTION

PATENT NO. : 4,233,207
DATED : November 11, 1980
INVENTOR(S) : John D. Spivack

It is certified that error appears in the above-identified patent and that said Letters Patent are hereby corrected as shown below:

Claim 14, Column 26, line 56 reads:

"phenoxyalkyl of 8 to 16 carbon atoms; or carbo-"

Claim 14, Column 26, line 57 reads:

"phenoxy or carbophenoxyalkyl with the penoxy"

Should read:

Line 56: "phenoxyalkyl of 8 to 16 carbon atoms; or said carbo-"

Line 57: "phenoxy or said carbophenoxyalkyl with the phenoxy".

Signed and Sealed this

Third Day of March 1981

[SEAL]

Attest:

Attesting Officer

RENE D. TEGTMEYER

Acting Commissioner of Patents and Trademarks

UNITED STATES PATENT AND TRADEMARK OFFICE
CERTIFICATE OF CORRECTION

PATENT NO. : 4,233,207
DATED : November 11, 1980
INVENTOR(S) : John D. Spivack

It is certified that error appears in the above-identified patent and that said Letters Patent are hereby corrected as shown below:

Claim 1, column 24, line 11 reads:

$R^1$ is branched alkyl of 3 to 8 carbon atoms, benzyl,

Should read:

-- $R^1$ is branched alkyl of 3 to 18 carbon atoms, benzyl,

Claim 5, column 26, line 4 reads:

(2,6-di-tert-butyl-4-methylphenyl)-O'-2,4-di-tert-butyl-

Should read:

-- (2,6-di-tert-butyl-4-methylphenyl)-O'-(-2,4-di-tert-butyl- --

UNITED STATES PATENT AND TRADEMARK OFFICE
CERTIFICATE OF CORRECTION

PATENT NO. : 4,233,207
DATED : November 11, 1980
INVENTOR(S) :

It is certified that error appears in the above-identified patent and that said Letters Patent are hereby corrected as shown below:

Claim 7, column 26, line 10 reads:

[2,6-di-tert-butylphenyl-4-(2-carbomethoxyethyl)-.

Should read:

-- [2,6-di-tert-butyl-4-(2-carbomethoxyethyl)- --

Claim 19, column 28, line 10 reads:

O,O'-bis(2,4-tri-tert-butylphenyl) phenylphosphonite.

should read:

-- O,O'-bis(2,4,6-tri-tert-butylphenyl) phenylphosphonite. --

Signed and Sealed this

Nineteenth Day of October 1982

[SEAL]

Attest:

GERALD J. MOSSINGHOFF

Attesting Officer     Commissioner of Patents and Trademarks